US009375595B2

(12) United States Patent
Taylor

(10) Patent No.: US 9,375,595 B2
(45) Date of Patent: Jun. 28, 2016

(54) SELF-TESTING AND SELF-CALIBRATING FIRE SPRINKLER SYSTEM, METHOD OF INSTALLATION AND METHOD OF USE

(76) Inventor: Jeremy Taylor, Albuquerque, NM (US)

( * ) Notice: Subject to any disclaimer, the term of this patent is extended or adjusted under 35 U.S.C. 154(b) by 848 days.

(21) Appl. No.: 13/360,609

(22) Filed: Jan. 27, 2012

(65) Prior Publication Data

US 2012/0298381 A1 Nov. 29, 2012

Related U.S. Application Data

(60) Provisional application No. 61/462,027, filed on Jan. 27, 2011.

(51) Int. Cl.
*A62C 35/64* (2006.01)
*G01L 27/00* (2006.01)
*A62C 37/50* (2006.01)

(52) U.S. Cl.
CPC *A62C 37/50* (2013.01); *A62C 35/64* (2013.01)

(58) Field of Classification Search
CPC ...... G01L 27/00; G01L 27/002; A62C 37/50; A62C 35/64; G01M 3/28
USPC .......................................................... 73/1.72
See application file for complete search history.

(56) References Cited

U.S. PATENT DOCUMENTS 3,227,219 A * 1/1966 Boyer et al. .................... 169/23
4,797,623 A * 1/1989 Hoffman et al. .............. 324/556
5,018,386 A * 5/1991 Zeoli .............................. 73/168
5,320,138 A * 6/1994 Ferlitch, Jr. ................ 137/552.7
5,680,329 A * 10/1997 Lloyd et al. .................. 700/275
5,772,403 A 6/1998 Allison et al.
6,302,146 B1 10/2001 McHugh
6,857,478 B1 * 2/2005 Weber ............................ 169/52
7,845,424 B1 12/2010 Miller
8,068,026 B1 11/2011 Delerno et al.
2001/0041139 A1 * 11/2001 Sabini et al. .................... 417/18
2003/0154763 A1 * 8/2003 Cain ............................. 73/1.16
2009/0050337 A1 * 2/2009 Yung et al. ...................... 169/17
2010/0221143 A1 9/2010 Broncano Atencia et al.

* cited by examiner

*Primary Examiner* — Daniel S Larkin
(74) *Attorney, Agent, or Firm* — Anthony J. Bourget

(57) ABSTRACT

A Self-Testing and Self-Setting residential fire pump system for residential fire protection. The system is designed to boost pressure into a residential sprinkler system when water supply is insufficient to meet the sprinkler system's design requirements. The system comprises an in-line vertical multi-stage, centrifugal pump connected to an electric motor with horsepower ranges from ¾ to 10, a flow rate range of 15 gpm-200 gpm, and pressure ranges of 20 psi-238 psi. The system also comprises a controller assembly which is programmed to Self-Test and Self-Calibrate to most residential fire sprinkler systems with the push of a button, and a manifold made from brass or stainless steel pipe fittings connected to the pump's suction and discharge ports, allowing water to flow from an existing water supply through the pump to either the test loop or existing residential fire sprinkler system. The pump and controller can be mounted on an ABS base.

20 Claims, 5 Drawing Sheets

SELF-TESTING AND SELF-CALIBRATING FIRE SPRINKLER SYSTEM, METHOD OF INSTALLATION AND METHOD OF USE

CROSS-REFERENCE TO RELATED APPLICATIONS

I hereby claim the benefit under Title 35, United States Code Section 119(e) of any United States Provisional Application(s) listed below:

Provisional Patent Application No. 61/462,027

Filing Date Jan. 27, 2011

STATEMENT REGARDING FEDERALLY SPONSORED RESEARCH AND DEVELOPMENT

Non-applicable

THE NAMES OF THE PARTIES TO A JOINT RESEARCH AGREEMENT

Non-applicable

INCORPORATION-BY-REFERENCE OF MATERIAL SUBMITTED ON A COMPACT DISC

Non-applicable

BACKGROUND OF THE INVENTION

1. Technical Field of the Invention

The present invention relates generally to water supplying systems where pressure switch settings are required, more specifically to fire sprinkler systems, and even more specifically to self-calibrating, self-testing, residential fire sprinkler systems.

2. Background of the Invention

The following description of the art related to the present invention refers to a number of publications and references similar products in the market. Discussion of such references herein is given to provide a more complete background of the scientific principles related to the present invention and is not to be construed as an admission that such publications are necessarily prior art for patentability determination purposes.

The U.S. accepted standard for home fire sprinkler systems is NFPA 13D, the"Standard for Installation of Sprinkler Systems in One- and Two-Family Dwellings and Manufactured Homes." Hundreds of municipalities across the U.S. have adopted the standard promulgated by NFPA 13D. Compliance with NFPA 13D is intended to prevent life loss, injury and property damage resulting from fire events. Specifically, the standard requires at least 10 minutes of sprinkler water on a residential fire in its initial stage of development. The idea is to: (1) allow early control of the fire; (2) to provide the occupants of the dwelling time to safely escape; and (3) provide the fire abatement unit adequate time to respond. A fire at a compliant dwelling should be at least controlled and may even be extinguished by the time the fire responders arrive.

NFPA 13D only requires installation of sprinklers in "living" areas. Accordingly, the standard does not apply to smaller bathrooms or closets, food storage rooms (pantries), garages, carports or other attached open structures, attics and other concealed non-living spaces.

Under NFPA 13D, two commonly used sprinkler systems are acceptable: (1) stand-alone or independent systems; and (2) multi-purpose, combined or network systems.

BRIEF SUMMARY OF THE INVENTION

The present invention aims to supplement and re-tool existing water supplies in residential systems with the ultimate objective being to meet the NPFA 13D promulgated standards. The system is designed to be easy to install and automatically calibrate (set) to any existing residential sprinkler system with the push of a single button. The system is designed to automatically test itself and key system parameters, helping fire protection professionals and residents feel comfortable and safe about the pump system.

It is a principal objective of the self-calibrating, self-testing fire sprinkler system and method of use disclosed and claimed in the present application to, at a minimum meet, and likely exceed the NFPA 13D standard.

There are several packaged residential fire pump systems currently on the market. In fact, the USPTO has issued patents to such packaged systems (See U.S. Pat. No. 7,845,424 issued to Miller). All commercially known systems, however, are lacking in the way in which they are calibrated to the residential sprinkler system, and in the method in which they are, or should be, tested. The present invention overcomes those deficiencies by eliminating the need for a pressure switch and the need for a manual test by the resident or fire protection contractor. The present invention combines a new and useful set of features which allows the invention to learn or adapt to the system to which it will be connected and to automatically test itself. That feature eliminates the human error which can be introduced if humans have to manually perform the required tests or set the pressure switches.

Another key shortcoming of the prior art systems is that by allowing the user to control the frequency of testing, the system can go untested for long periods of time. The pump of a system which sits untested for an extended period of time can become seized or locked up. Accordingly, if a situation arises when the pump element of the system is supposed to spring into action, there is a possibility the pump will fail to run. The invention disclosed and claimed in the present application takes the task and responsibility of remembering to test a system away from the user by performing that task automatically.

BRIEF DESCRIPTION OF THE SEVERAL VIEWS OF THE DRAWINGS

The accompanying drawings, which are incorporated into and form a part of the specification, illustrate an embodiment of the present invention and, together with the description, serve to explain the principles of the invention. The drawings are only for the purpose of illustrating a preferred embodiment of the invention and are not to be construed as limiting the invention.

DETAILED DESCRIPTION OF THE INVENTION

Figure 1:
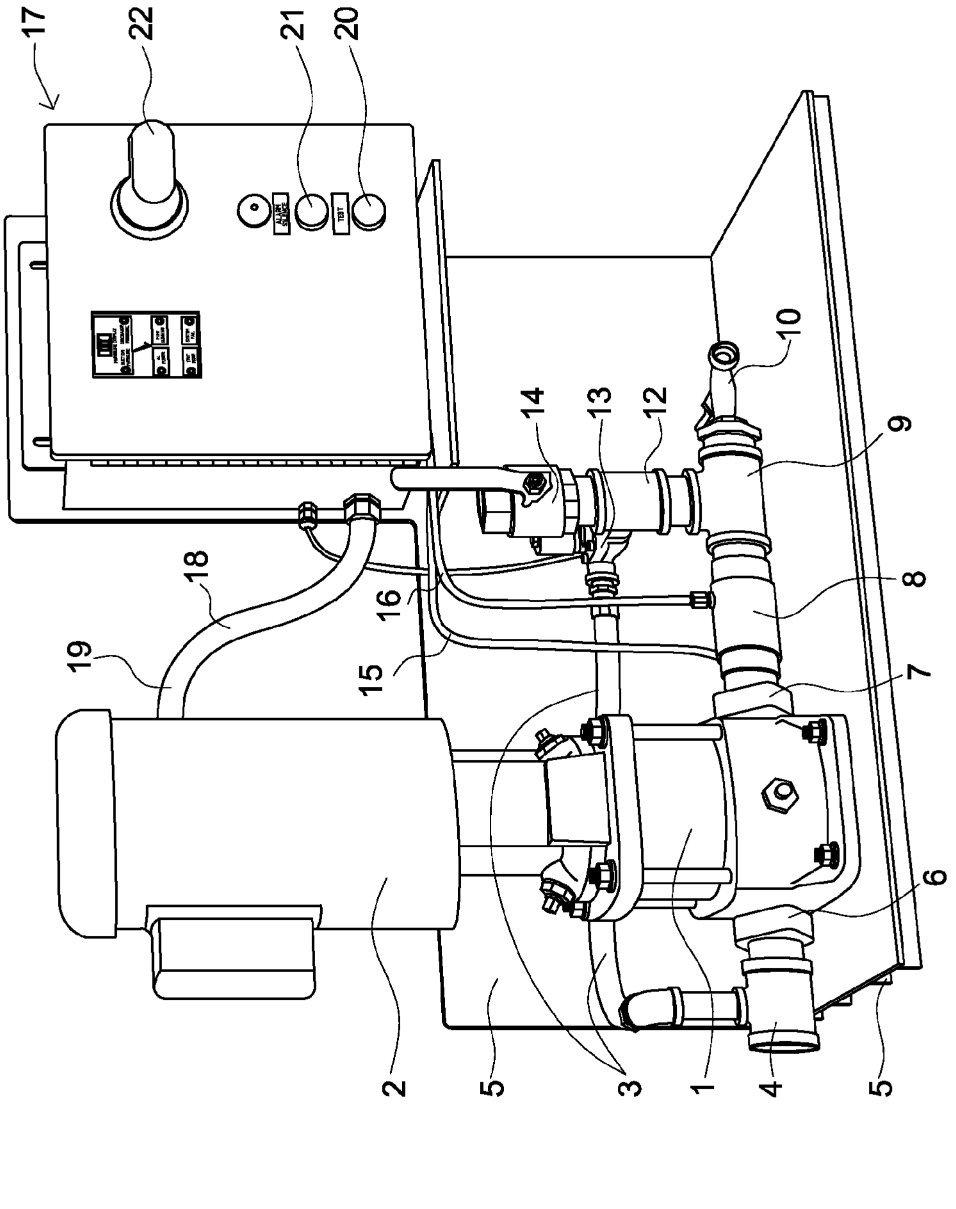
FIG. 1 depicts the front view of an embodiment of the invention.

The system of the present invention is primarily designed to service the residential fire sprinkler market. The system, as depicted in FIG. 1, comprises the following elements: a pump (1), an electric motor (2) engaged to the pump, a controller assembly (17), a solenoid test valve (13), and a manifold assembled out of, and comprising, standard pipe fittings. In the preferred embodiment, the elements of the present invention are all assembled and supported by a custom fabricated Acrylonitrile Butadiene Styrene (ABS) base (5). Elements of the present invention can be used as stand alone elements as well. For instance, a user who already owns a pump and motor could install the controller assembly, solenoid test valve and manifold, as opposed to every element in the preferred embodiment. The base (5) in particular is not a required function of the system, just an added feature for installers and home owners who would prefer to purchase all elements as a package.

The system can be connected to any existing water supply, such as a storage tank or a pressurized supply line. Further, the system is capable of being connected to an existing residential fire sprinkler system. The preferred embodiment of the system is capable of being connected to and actuated by an existing 230V power supply. NFPA 13D requires single phase, 230V power, however, the current invention can be supplied with elements that work with any voltage where different standards are required or approved by local authority. The system is not limited to 230V single phase power.

The preferred pump of the present invention is an in-line vertical multi-stage centrifugal pump. While this style pump is the preferred embodiment, the panel can be connected to virtually any style pump. Type of pump is not a limiting factor of the system. The in-line design allows for the pump to be installed in a horizontal position in the preferred embodiment, allowing the suction and discharge lines to be on the same horizontal plane. The resulting vertical configuration allows for the unit to occupy minimal floor space. In the preferred embodiment, the pump is a multi-staged pump, meaning it is has one or more impeller assemblies. The number of stages (impeller assemblies) in the pump is directly related to the required pressure the pump must add to the sprinkler system in order for the sprinkler system to function as desired. The number of stages can range from 1-25. All wetted parts of the pump are typically manufactured from 304 stainless steel. The base and motor stool of the pump are typically made of cast iron. The pump typically comes in different impeller diameter sizes with flow rates ranging from 15 gallons per minute (gpm) to 200 gallons per minute (gpm).

The pump (1) is connected to an electric motor (2). The motor's horsepower (HP) is determined by the flow and pressure requirements of each sprinkler system. Motor horse power typically ranges from ¾ to 10 HP, depending on the requirements of the system. The motor (2) of the preferred embodiment is capable of working with existing 230V single phase power and is hard wired to the controller assembly (17).

Figure 2:
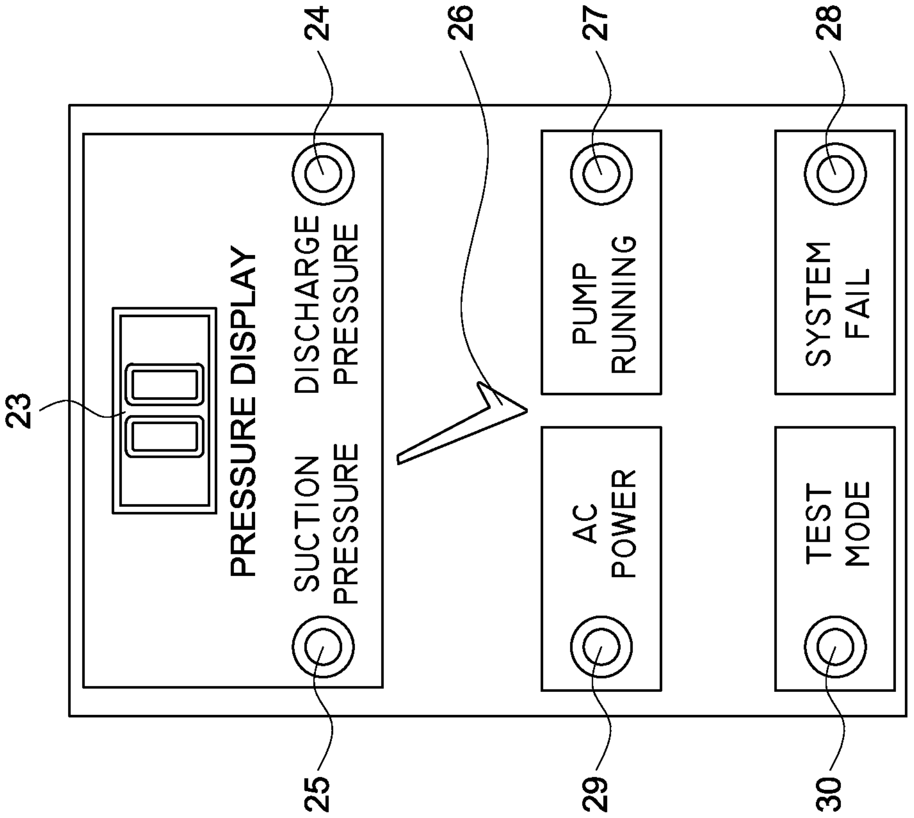
FIG. 2 depicts a close up view of the display board of the control panel with callouts 23 through 30.

The packaged unit of the present invention comprises a controller panel as shown and illustrated in FIGS. 1 and 2. The front of the panel, referred to as the panel face, comprises a number of buttons or switches and a number of visual indicators. The buttons or switches include a power switch (22), an alarm silence switch (21) and a switch for test mode (20). The indicators include a digital readout and lights indicating various system status readouts. The displays are shown in FIG. 2. The readouts can include, but are not limited to: Green Check Mark (26), AC Power (29), System Failure (28), Test Mode (30), Suction Pressure (25), Discharge Pressure (24), and Pump Running (27). In addition, the Suction Pressure and Discharge Pressure indicators can be paired with a digital display (23). The digital display shows the digital pressure, as measured by the suction transducer (37) and the discharge transducer (36). The indicator for either Suction Pressure (25) or Discharge Pressure (24) will activate to show which of the readings is shown on the digital display (23).

Figure 3:
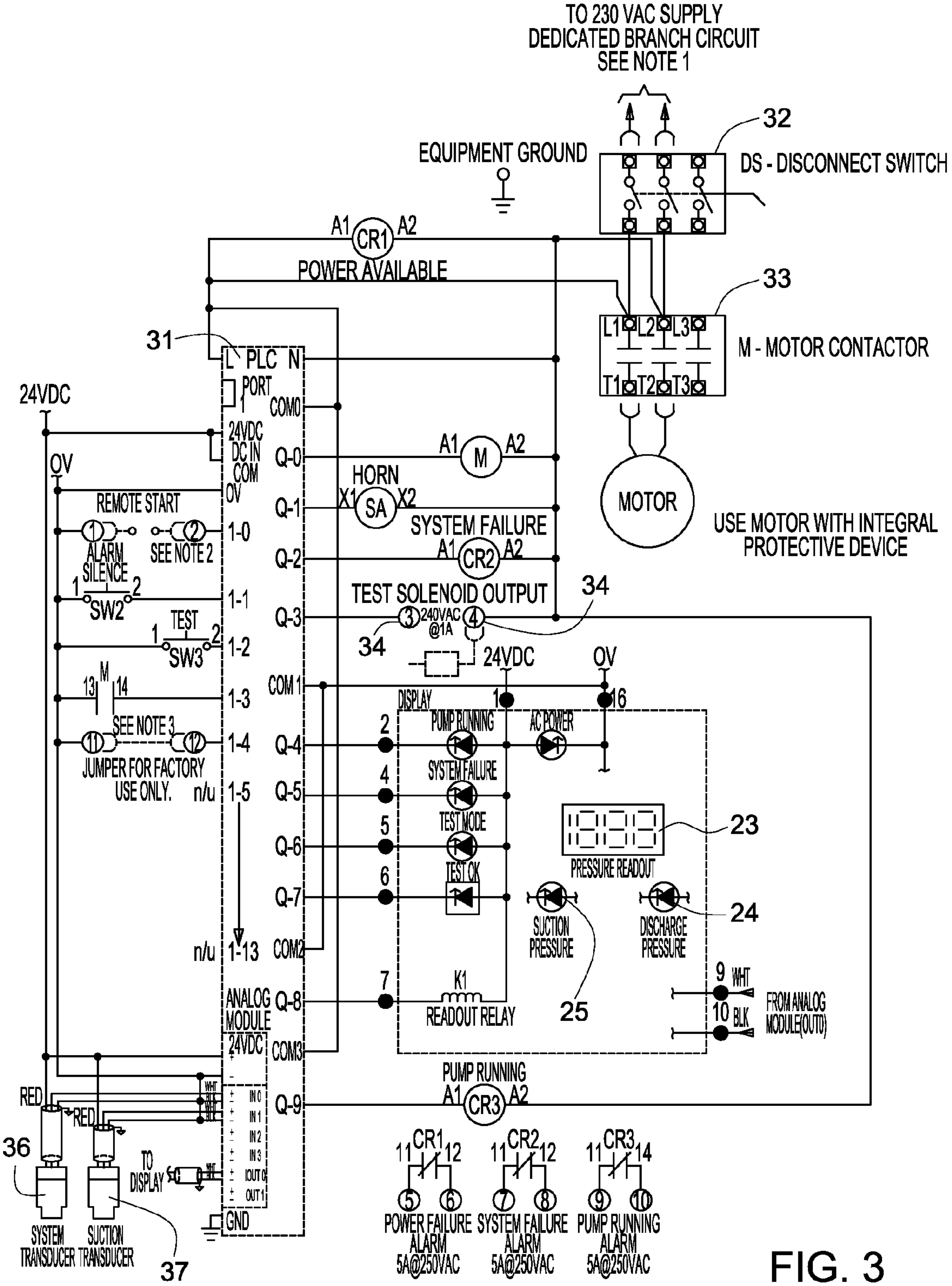
FIG. 3 depicts an electrical schematic of the invention.
Figure 4:
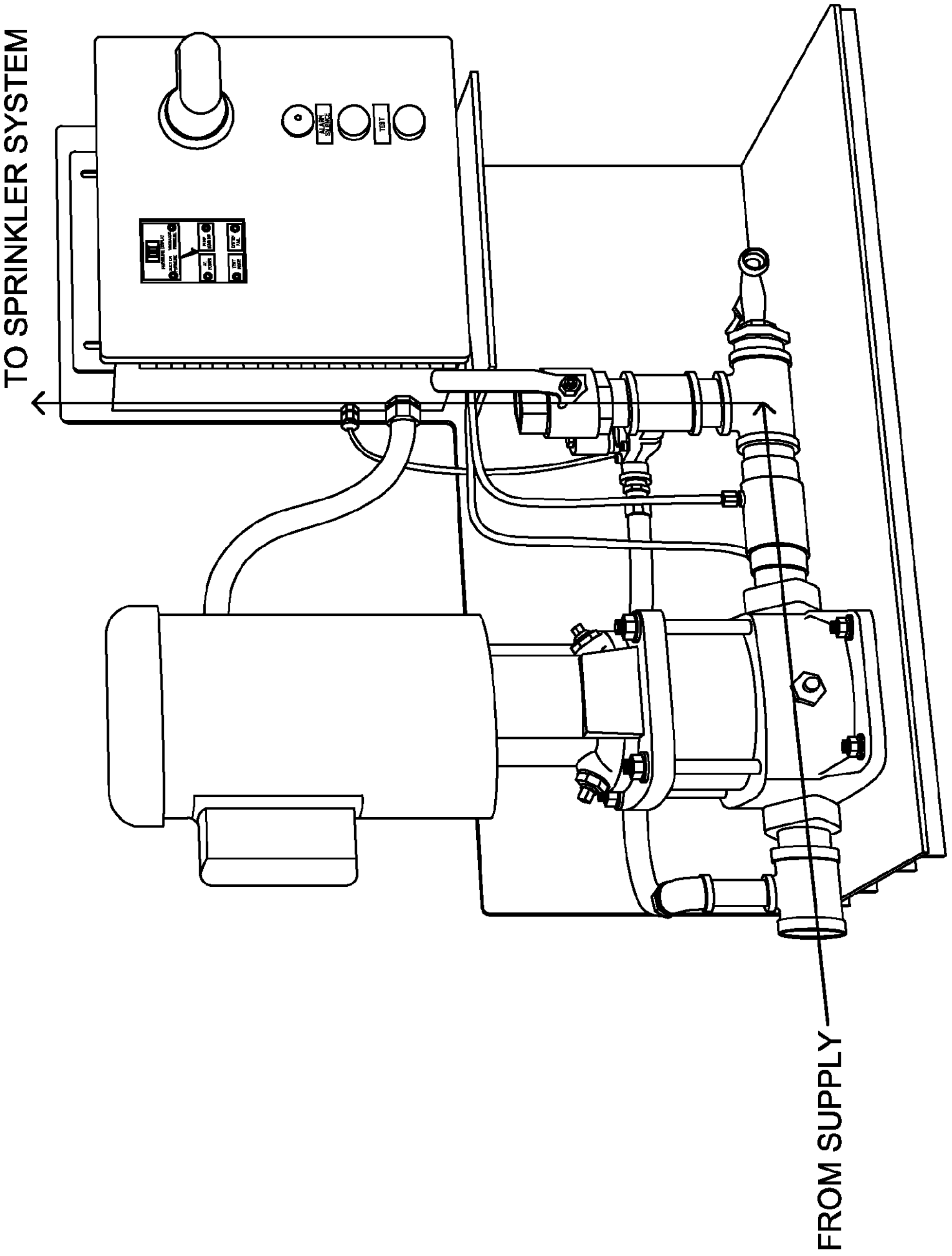
FIG. 4 depicts a flow chart for water flow under "sprinkler demand" conditions.
Figure 5:
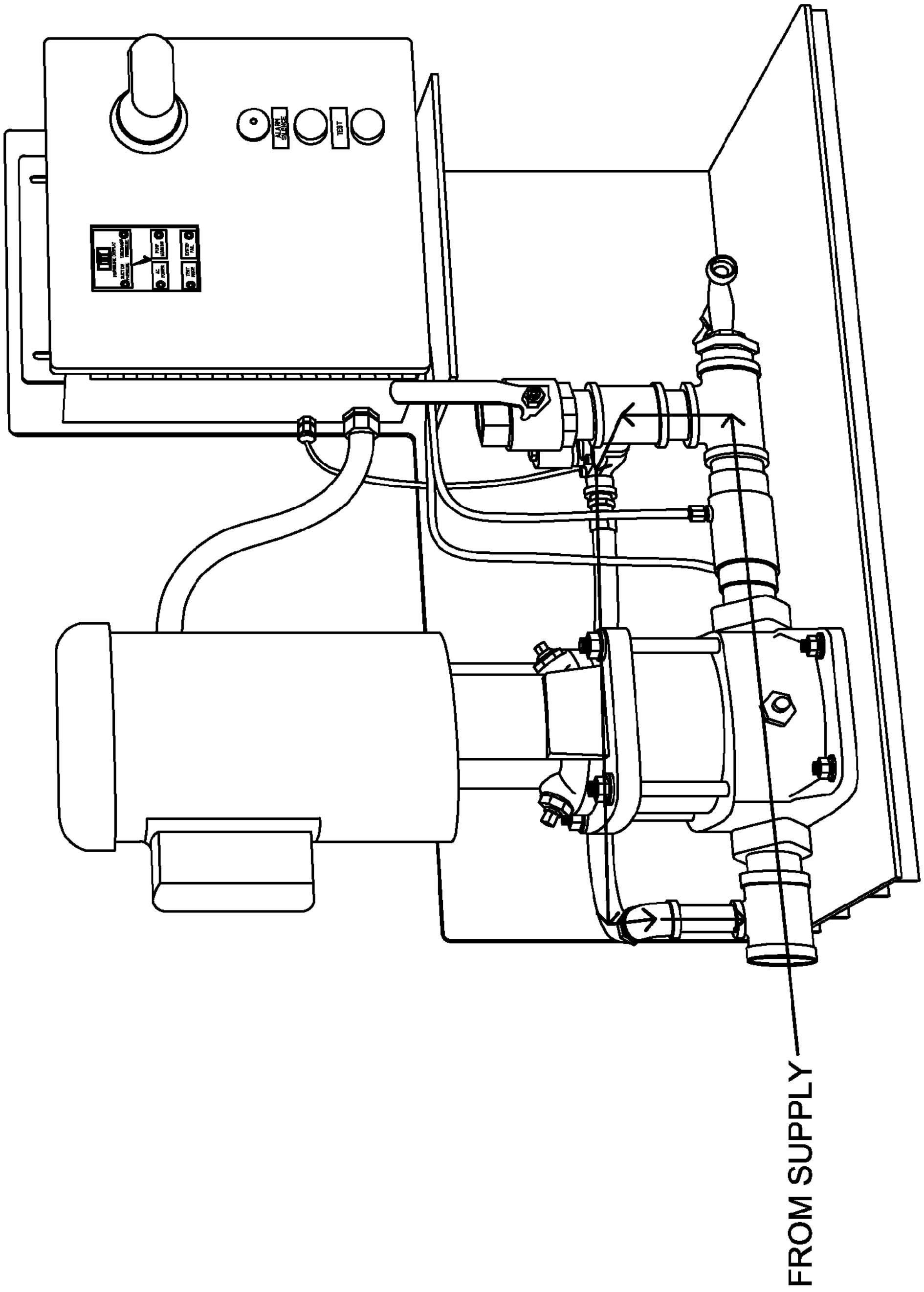
FIG. 5 depicts a flow chart for water flow through test solenoid and test loop.

The controller panel houses the controller assembly, which is detailed in FIG. 3. The controller assembly comprises a Program Logic Controller, or PLC (31) or Control Board, a motor contactor (33), a disconnect lever (switch) (32), a suction transducer (37), a discharge pressure transducer (36), multiple visual display means (light-emitting diode (LED) lights), multiple dry contacts for power failure, a pump failure alarm, and a pump running, and remote start. In the preferred embodiment, the panel assembly is housed in a NEMA 2 enclosure made with 16 gauge sheet steel and finished with a colored baked enamel. In alternative embodiments, the controller enclosure can be made to suit job site requirements. In the preferred embodiment, the controller assembly is mounted and supported by the fabricated ABS base. The controller can be mounted to wall or other surfaces in circumstances where a base is not desirable.

The Programmable Logic Controller (PLC) (31) is a microcomputer located inside the control assembly programmed to perform and monitor automatic tasks. A pre-programmed control board can be used in place of a PLC, which requires programming.

The Suction Transducer (37) reads suction pressure from the suction pressure sensing line (15) and sends information to controller PLC (31). The Discharge Transducer (36) reads discharge pressure from the discharge pressure sensing line (16) and sends information to controller PLC (31).

Test Solenoid Outputs (34) allow power to travel to the test solenoid when told to do so by the PLC (31). The test solenoid (13) will only open when it is receiving power.

Green Check Light is a readout located on panel face and illuminated by LED light which is only illuminated when system is successfully calibrated and tested. In the preferred embodiment, the readout is green to signal that the system is in working order.

Connected to the pump is the suction and discharge piping manifold fabricated of either brass or stainless steel standard pipe fittings. The manifold includes the test solenoid valve (13), and depending on the source of supply, the manifold comprises a test loop (3). The manifold sizing is determined by the flow rate requirements. In the preferred embodiment, the manifold and test loop are sized as follows:

Manifold Sizing

Flow of 15 gpm=1" manifold
Flow of 15 gpm-30 gpm=1¼" manifold
Flow of 30 gpm-40 gpm=1½" manifold
Flow of 40 gpm-60 gpm=2" manifold
Flow greater then 60 gpm=3" manifold Test Loop Sizing Design flow of 50 gpm or less=½" test loop
Design flow greater then 50 gpm=¾" test loop The suction manifold starts at the suction port (6) of the pump (1). For systems that are fed by a storage tank, the suction manifold comprises a properly sized tee (4) as set forth in FIG. 1, with a vertical reducing port. The back side of the tee comprises a ¼" tapped connection to the suction pressure sensing line (15). The suction sensing line in turn is capable of being connected to a suction pressure transducer (37) in the controller assembly. A reduced vertical exit port of the tee provides a connection for a short nipple. Connected to the nipple is a 90 degree elbow of the same size as the nipple. Connected to the elbow is a high pressure hose which is the same size as the elbow. The connection point of the hose comprises the end of the automatic test loop (3).

For the embodiment(s) of the invention in which water supply is a pressurized domestic system, the suction manifold comprises a correctly sized coupling in place of the tee (4) shown in FIG. 1. The suction manifold is then tapped with a ¼" connection allowing for the suction pressure sensing line (15) to be connected to the suction manifold. The existing domestic system is then connected to the coupling. This embodiment of the invention also comprises a valve to close off the water supply.

The discharge manifold starts at the discharge port (7) of the pump (1). Connected to the discharge port is a properly sized short nipple which is connected to a similar sized tapped check valve (8). The ¼" tap on the check valve provides a connection for the discharge pressure sensing line (16). The discharge sensing line is connected to the discharge pressure transducer (36) inside the controller assembly (17). Connected to the exit port of the tapped check valve is a similarly sized short nipple which is connected to a tee (9) of a similar size. Connected to the horizontal exit port of the tee is the system drain valve (10). Connected to the vertical port of the tee is a short nipple which is connected to the test loop reducing tee (12). Connected to the horizontal reduced tee is a short nipple which is connected to the test solenoid valve (13). The test solenoid is electrically connected to the controller assembly (17).

The embodiment(s) of the present invention, in which the water supply is a storage tank instead of a domestic water system, also comprise a high pressure hose capable of being connected to the exit port of the test solenoid valve, which is the start of the test loop (3). The test loop is connected to the suction manifold as described above.

For the embodiment of the present invention connected to a pressurized domestic supply, the exit port of the test solenoid valve is a short nipple with exposed male pipe threads. Connected to this nipple is drain piping carrying test water to the waste pipe of the residential plumbing system. On the vertical exit port of the reducing test loop tee is a short nipple which is connected to a ball valve (14). The ball valve is the connection point for the existing sprinkler system. All discharge fittings can either be brass or stainless steel and are sized per flow rate requirements.

In the preferred embodiment, the entire system is supported by a fabricated ABS base (5) comprising a bottom side which is generally 12" to 18" wide and 2' 6" long to 3' 6" long. The base bottom side further comprises custom fabricated support channels capable of supporting the vertical loads applied to the base by the pump and panel. The support channels are designed for human fingers to fit in between them, allowing for transportation of the unit. The panel is supported by two 12" tall support panels, which support the panel base. The panel is then bolted to the ABS back panel support. With exception of the support channels, panel support legs, and panel support base, the ABS fabricated base is all one solid piece of ABS. This base is a feature of the system, but not a requirement to achieve the underline goal of a "self-testing, self-calibrating" system.

There are several modes in which the system will operate. The modes are (1) demo/test mode; (2) low pressure start mode; (3) recovered low pressure mode; and (4) slow pressure drop mode:

Demo/Test Mode:

For testing and demonstrations, the control panel can be placed in a "Demo/Test Mode" by wiring in a jumper wire into the PLC terminal board. This is a mode designed for factory/distributor testing/demonstrations only. When the jumper is added, the standard ten minute minimum run timer will change to a one minute minimum run time allowing for quicker more frequent tests. The standard fourteen day span between automatic tests is changed to a ten minute or other short time span. This will allow for a minimum of an equivalent of six months of automatic testing to be performed by the panel prior to shipping out a unit.

Low Pressure Start Mode:

When discharge pressure quickly dops from its "No Flow" setting, the controller will turn the pump on. As long as discharge pressure reading stays below the "pump on" setting the pump will continue running until manual shut off.

Recovered Low Pressure Start Mode:

When discharge pressure quickly drops from its "no flow" settings, the controller will turn on the pump. If the discharge pressure recovers, the controller will activate the ten minute run timer, but to protect the pump from overheating or other damage from pumping water against a "dead head" for ten minutes, the controller will open up the test solenoid for two seconds every twenty seconds, allowing for fresh water to enter the pump, helping it stay cool.

Slow Pressure Drop Mode:

When the discharge pressure slowly drops over time, the panel will assume pressure drop is due to a change in system conditions or a slow leak. It is safe to assume that pressure drop is not due to a sprinkler opening or any opening of a sprinkler will cause a rapid drop in pressure. In this mode, the controller will activate a one minute minimum run timer when the pump is started, thus saving the pump ten minutes of dead pumping.

The self-testing, self-calibrating methods disclosed and claimed in the present application present numerous distinct advantages over any available manual or user indiced calibration and testing methods of the prior art. In fact, if the self-testing method indicates that the suction pressure is higher than the original pressure reading, the user will know something has changed with the home water supply. If, on the other hand, the discharge pressure is higher than the original pressure readings, the user will know that there has either been an increase in suction pressure or the discharge pressure transducer may have failed.

If the self-testing indicates that the discharge pressure is below the original pressure readings, the user will know that either the water supply is low or the water or pump is underperforming. Such knowledge would allow the user to predict pump wear or a potential problem due to water supply or to determine that there is debris in the pump. If the system produces a stable pressure reading under flow conditions, the controller PLC stops sending power to the solenoid test valve and tells it to close. During this time the pump will return to pumping at "no flow" conditions. By means of pressure information being sent back to the Controller PLC by means of pressure transducers, the PLC will verify that pressure is equal to calibration conditions. If they (the test pressure readings and the calibration pressure readings) are not the same, the test will fail. If they are the same, the test will be successful.

The steps of calibration are:

1. Verify that the discharge valve is closed.
2. Open the suction valve, which allows water to flow freely into the pump system from the supply side.
3. Prime the pump's vent by opening it to insure the pump is filled with water.
4. Visually check the system for leaks.
5. Turn the system on in order to allow calibration to an existing sprinkler system;
6. Turn the controller assembly handle to the on position.

7. Wait about three seconds to see if an audible alarm sounds, which would signal that the system is not calibrated.
8. Push the test button so that the pump motor receives electrical power sufficient to turn on from the controller assembly (PLC). During the first five seconds of pumping, the pump pushes water against the closed discharge valve thus allowing pressure to be sensed by the suction and discharge pressure transducers located in the controller assembly (PLC) by means of the suction and pressure sensing lines.
9. Wait for the information gathered by the transducers to be sent to the controller assembly. The controller assembly (PLC) will learn the system suction pressure and the "no flow" discharge pressure capabilities of the pump while the pump is pumping against a closed valve, resulting in the pump running under no flow conditions.
10. The controller assembly (PLC) will send a signal to a check light located on the control panel's face so that the light starts blinking on the control panel, signalling that the discharge valve is ready to be opened.
11. Open the valve, which allows the discharge transducer to sense and relay to the controller an instant drop in pressure as the sprinkler system piping begins to fill. When the sprinkler system piping is full, the pump returns to "no flow" conditions.
12. Wait for the controller to recognize the state of the system by means of constant pressure readings being sent to it by the discharge pressure transducer. Once sufficient time elapses to achieve a no-flow pressure reading, the controller will send a power to the test solenoid valve allowing it to open.
13. If the readings from the calibration and test steps are the same, then the pump is deemed to be working correctly, which will result in the system being started at the first sign of a pressure drop, which simulates an open sprinkler in the house.
14. Once water is being pumped with an open solenoid, wait for the controller PLC, by means of the pressure readings being sent by the suction and discharge pressure transducers, to sense and record the suction and discharge pressure under pump running with flow conditions.
15. Wait for the system to produce stable pressure reading under flow conditions, which will result in the controller cutting power to the test solenoid valve thus resulting in the valve closing.
16. The pump will continue pumping against what are now no flow conditions.
17. The controller, by means of the pressure transducers, will verify no flow conditions and send electrical power to a green check LED, which will turn solid green indicating that they system is calibrated and ready for use.

The steps of testing the system are:

1. Set an automatic test interval.
2. Obtain suction and discharge pressure readings at static conditions by means of the suction and discharge pressure transducers reading line pressure.
3. Input that information to the controller.
4. The controller, by means of readings sent by the pressure transducers, will verify that the static suction and discharge pressure are the same as they were at calibration.
5. If either suction or discharge pressures are higher or lower than they were at calibration, then the test fails and the system stops.
6. If the suction and discharge pressures are the same as they were at calibration, then the test continues.
7. The controller will send a signal to the solenoid test valve telling it to open.
8. Once the solenoid valve is open, the controller, by means of pressure information sent to it by the discharge pressure transducer, will detect an instant drop in pressure. The pressure drop indicates a demand for water because the solenoid valve has opened.
9. Program the controller to start the pump at an adjustable percentage below the set discharge pressure.
10. If the discharge pressure transducer does not send a drop in pressure to the controller, then the solenoid valve has failed and the test will stop.
11. If the controller reads a "start point" pressure, the controller turns on the pump.
12. The transducers send pressure readings to the controller and the controller verifies that the readings are the same as the readings taken during the calibration step.
13. If the readings from the calibration and test steps are the same, then the pump is deemed to be working correctly, which will result in the system being started at the first sign of pressure drop, which simulates an open sprinkler in the house.
14. If the pressure readings during the test are higher or lower than the reading during the calibration step, then the test is deemed to have failed.

The installation of the current invention is simple, especially in that it is capable of working with a variety of different sprinkler configurations and water sources. Installation is accomplished in five steps. First the water supply is connected to the pump (1). Next, the water supply is connected to the suction manifold. The residential sprinkler system is connected to the discharge valve (14). Then the controller assembly (17) is connected to an electrical power source. Finally, the power is connected to the control panel.

While the current invention has been shown to be useful as self-calibrating and self-testing fire sprinkler system and method of use, its value as a water dispensing system goes beyond that particular use. Generally, although the invention has been described in detail with particular reference to the above preferred embodiment(s), other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

What is claimed is:

1. A method of testing a fire sprinkler system having a pump and a test valve positioned downstream from the pump, said method comprising:

opening the test valve;

first comparing, by use of a controller, pump discharge pressure information with stored pump discharge pressure information, the stored pump discharge pressure information being a discharge pressure reading sent to the controller; and sending a signal from the controller to activate the pump in response to a drop in pump discharge pressure.

2. The method of claim 1 further comprising a subsequent comparing of discharge pressure information from the pump with stored digital pump discharge pressure information to determine if the discharge pressure information from the pump is equivalent to the stored digital pump discharge pressure information.

3. The method of claim 2 further comprising displaying a signal in response to said subsequent comparing step where said displaying corresponds to a pass of the test.

4. The method of claim 2 further comprising display of a failure signal where discharge pressure information associated with a discharge side of the pump shows a pressure higher or lower than the stored discharge pressure information associated with the discharge side of the pump.

5. The method of claim 1 where said first comparing comprises comparing the pump discharge pressure information with stored calibrated pump discharge information where the calibrated information is automatically obtained without human input of the information.

6. The method of claim 1 further comprising, prior to said opening step, initial comparing discharge pressure information from at least one discharge pressure transducer associated with a discharge side of the pump with calibrated discharge pressure information received from the at least one pressure transducer.

7. The method of claim 1 where the stored pump discharge pressure information is a numerical value.

8. The method of claim 1 where the stored pump discharge pressure information is a reading received from a discharge pressure transducer.

9. A method of testing a fire sprinkler system having a pump and a test valve positioned downstream from the pump, said method comprising:

opening the test valve;

first comparing, by use of a controller, pump discharge pressure information with stored pump discharge pressure information; and sending a signal from the controller to activate the pump in response to a drop in pump discharge pressure, said opening the test valve comprises automatic opening of an electronically activated valve, without human involvement, at a test interval.

10. A method of testing a fire sprinkler system having a pump and a test valve positioned downstream from the pump, said method comprising:

opening the test valve;

first comparing, by use of a controller, pump discharge pressure information with stored pump discharge pressure information;

sending a signal from the controller to activate the pump in response to a drop in pump discharge pressure; and calibrating the system prior to said opening of the test valve where the system includes a discharge valve positioned downstream from the pump, said calibrating comprising:

maintaining the discharge valve in a closed condition;

activating the pump to push water against a closed condition; and storing pressure information associated with water pressure discharged from the pump as stored calibrated discharge pressure information and representing a no-flow condition.

11. The method of claim 10 where said storing pressure information includes storing suction pressure information associated with a pressure at a suction side of the pump and representing a no-flow condition.

12. The method of claim 10 further comprising utilizing a discharge pressure transducer to measure discharge pressure information and where activating the pump to push water against a closed condition comprises pumping water against the closed discharge valve.

13. The method of claim 10 further comprising opening the discharge valve and utilizing a discharge pressure transducer to measure discharge pressure information.

14. The method of claim 13 further comprising storing the discharge pressure information associated with water pressure discharged from the pump and where the discharge pressure information corresponds with a no-flow condition where the discharge valve is in fluid communication with existing sprinkler system piping.

15. The method of claim 13 further comprising opening the test valve and utilizing a discharge pressure transducer to measure discharge pressure information.

16. The method of claim 15 further comprising storing the discharge pressure information associated with a pump running under a flow condition.

17. The method of claim 16 further comprising utilizing a suction pressure transducer to measure suction pressure information at a suction side of the pump and storing the suction pressure information associated with a pump running under a flow condition.

18. The method of claim 16 further comprising closing the test valve while allowing the pump to continue running in a no-flow condition and utilizing the pressure transducer to measure discharge pressure.

19. The method of claim 18 further comprising verifying a no-flow condition.

20. The method of claim 10 where said storing pressure information associated with water pressure discharged from the pump as stored calibrated discharge pressure information and representing a no-flow condition comprises storing pressure information associated with water otherwise discharged from the pump.

* * * * *